United States Patent
Koshikawa et al.

(10) Patent No.: US 8,492,487 B2
(45) Date of Patent: Jul. 23, 2013

(54) THERMOSETTING FLUOROPOLYETHER ADHESIVE COMPOSITION AND ADHESION METHOD

(75) Inventors: Hidenori Koshikawa, Annaka (JP); Mikio Shiono, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 95 days.

(21) Appl. No.: 13/293,543

(22) Filed: Nov. 10, 2011

(65) Prior Publication Data

US 2012/0123049 A1 May 17, 2012

(30) Foreign Application Priority Data

Nov. 15, 2010 (JP) ................................. 2010-254812

(51) Int. Cl.
*C08L 71/02* (2006.01)
*C08L 83/05* (2006.01)

(52) U.S. Cl.
USPC ............. 525/478; 525/403; 525/479; 528/25; 528/27; 528/34; 528/42; 528/43; 528/15

(58) Field of Classification Search
None
See application file for complete search history.

(56) References Cited

U.S. PATENT DOCUMENTS

| | | |
|---|---|---|
| 5,656,711 A | 8/1997 | Fukuda et al. |
| 5,665,846 A | 9/1997 | Sato et al. |
| 7,851,066 B2 * | 12/2010 | Yamaguchi et al. .......... 428/447 |
| 8,110,065 B2 * | 2/2012 | Koshikawa et al. .......... 156/325 |
| 2007/0191554 A1 * | 8/2007 | Yamaguchi et al. .......... 525/479 |
| 2008/0289760 A1 | 11/2008 | Koshikawa et al. |
| 2011/0178263 A1 * | 7/2011 | Koshikawa et al. ............ 528/15 |

FOREIGN PATENT DOCUMENTS

| | | | |
|---|---|---|---|
| JP | 3-163183 A | * | 7/1991 |
| JP | 2990646 B2 | | 12/1999 |
| JP | 3239717 B2 | | 12/2001 |
| JP | 2008-291142 | | 12/2008 |
| JP | 2012-1652 | | 1/2012 |

* cited by examiner

*Primary Examiner* — Marc Zimmer
(74) *Attorney, Agent, or Firm* — Oblon, Spivak, McClelland, Maier & Neustadt, L.L.P.

(57) ABSTRACT

A thermosetting fluoropolyether adhesive composition is provided. This composition cures at lower than 100° C., and the cured product exhibits good adhesion to various substrates and excellent adhesion durability at a temperature of up to 150° C. A method for adhering the composition to the substrate is also provided. The composition comprises (A) a straight chain polyfluoro compound, (B) a fluorine-containing organohydrogenpolysiloxane containing at least 2 SiH groups and not containing other functional group, (C) a platinum group metal catalyst, (D) a fluorine-containing organohydrogenpolysiloxane containing a fluorine-containing organic group, SiH group, epoxy group and/or tri(organoxy)silyl group, and an aryl group, (E) a polyhydric allyl ester compound, (F) an organosilicon compound having epoxy group and an organoxy group, and not containing SiH group, and (G) an organosilicon compound having SiH group and an aryl group, and not containing epoxy group or a tri(organoxy) silyl group, or a fluorine-containing organic group.

8 Claims, No Drawings

THERMOSETTING FLUOROPOLYETHER ADHESIVE COMPOSITION AND ADHESION METHOD

CROSS-REFERENCE TO RELATED APPLICATION

This non-provisional application claims priority under 35 U.S.C. §119(a) on Patent Application No. 2010-254812 filed in Japan on Nov. 15, 2010, the entire contents of which are hereby incorporated by reference.

TECHNICAL FIELD

This invention relates to a thermosetting fluoropolyether adhesive composition exhibiting excellent adhesion to a metal, inorganic, and plastic substrates, and more specifically, to a thermosetting fluoropolyether adhesive composition which cures by heating at a temperature lower than 100° C. and exhibits excellent adhesion to an inorganic material such as metal, for example, aluminum or alumina ceramics as well as plastic materials such as polybuthylene terephthalate (PBT) resin and polyphenylene sulfide (PPS) resin, and excellent adhesion durability at a temperature up to 150° C. This invention also relates to a method for adhering the adhesive composition to a metal, inorganic, or plastic substrate.

BACKGROUND ART

Japanese Patent No. 2990646 proposes use of a composition comprising a straight chain fluoro polyether compound having at least two alkenyl groups and also having a perfluoropolyether structure in the backbone in one molecule, a fluorine-containing organohydrogensiloxane having at least two hydrogen atoms directly bonded to the silicon atom in one molecule, and a platinum group compound for the production of a cured product having well balanced heat resistance, chemical resistance, solvent resistance, releasability, water repellency, oil repellency, and low temperature properties.

Japanese Patent No. 3239717 proposes a composition having organopolysiloxane having hydrosilyl group and epoxy group and/or a trialkoxysilyl group added to the composition of the Japanese Patent No. 2990646 in order to provide the composition with self adhesive property with the metal or plastic substrate. This adhesive composition can be cured by heating, and the resulting cured article has improved features as described above and this composition can be used for adhesion application in various industrial fields such as electrical and electronic parts and parts mounted on motor vehicles.

However, heating to a high temperature of 100 to 200° C. is necessary for realizing adhesion of such adhesive composition to the metal, inorganic, and plastic substrates. Accordingly, when the substrate is a thermoplastic resin having a low heat resistance, changes in the shape and quality is induced by the heating. Also, use of such adhesive composition had limitation for the parts with the size that can not fit in the furnace. Furthermore, heating at such high temperature was disadvantageous in view of the energy cost of the furnace, and also, in environmental view of the amount of the carbon dioxide discharged from the furnace.

In view of the situation as described above, Japanese Patent Application Laid-Open No. 2008-291142 proposes further addition of a compound having at least two allyl oxycarbonyl group ($CH_2$=$CHCH_2OC$(=O)—) in one molecule to the adhesive composition as described above for the purpose of developing adhesive properties to the metal or plastic substrate by a heat treatment of up to 100° C.

This improvement realized excellent initial adhesion. However, when the composition is left at a relatively high temperature below 100° C., for example, at 80° C., for a long time, the composition suffered from the problem of substantial loss in the adhesiveness. For use in the application around electrical and electronic parts and parts mounted on motor vehicles, the adhesive is required to have an adhesion durability such that the adhesion would be maintained under such temperature conditions.

SUMMARY OF THE INVENTION

The present invention has been accomplished in view of the situation as described above, and an object of the present invention is to provide a thermosetting fluoropolyether adhesive composition which cures by heating at a temperature lower than 100° C. and exhibits excellent adhesion to a metal, inorganic, or plastic substrate, and which also exhibits excellent adhesion durability at a temperature up to 150° C. Another object of the invention is to provide a method for adhering the adhesive composition with a metal, inorganic, or plastic substrate.

The inventors of the present invention have proposed a solution for the problem of the high temperature adhesion durability in Japanese Patent Application No. 2010-139059. More specifically, the inventors proposed an adhesive composition having an improved adhesive durability at a temperature of lower than 100° C., which comprises a compound having at least 2 allyloxycarbonyl groups ($CH_2$=$CHCH_2C$(=O)—) in one molecule; an adhesiveness-imparting organohydrogenpolysiloxane having a fluorine-containing organic group, hydrogen atom directly bonded to the silicon atom, epoxy group and/or trialkoxysilyl group bonded to the silicon atom via carbon atom or carbon and oxygen atoms, and an aryl group bonded to the silicon atom via carbon atom in one molecule; and an organosilicon compound containing at least one epoxy group and at least one alkoxy group directly bonded to the silicon atom in one molecule.

However, there is recently a demand for an adhesion durability at a temperature in excess of 100° C. such as 150° C. The adhesive composition as described above often exhibited loss of the adhesiveness when the composition was left at 150° C. for a long time.

The inventors of the present invention conducted further study, and found that when a composition comprising particular amounts of (A) a straight chain polyfluoro compound represented by the following general formula (1), (B) a fluorine-containing organohydrogenpolysiloxane containing at least 2 hydrogen atoms directly bonded to the silicon atom (SiH group) in one molecule and not containing other functional group in the molecule, (C) a platinum group metal catalyst, (D) a fluorine-containing organohydrogenpolysiloxane containing a fluorine-containing organic group, hydrogen atom directly bonded to the silicon atom (SiH group), epoxy group and/or tri(organoxy)silyl group bonded to the silicon atom via carbon atom or carbon and oxygen atoms, and an aryl group bonded to the silicon atom via the carbon atom in one molecule, (E) a polyhydric allyl ester compound represented by the following general formula (6), (F) an organosilicon compound having at least one epoxy group and at least one organoxy group directly bonded to the silicon atom in one molecule, and not containing hydrogen atom bonded to the silicon atom (SiH group) in the molecule, and (G) an organosilicon compound having at least one hydrogen atom bonded to the silicon atom (SiH group) and at least one aryl group directly bonded to the silicon atom or bonded to the silicon atom via carbon atom in one molecule, and not containing epoxy group or a tri(organoxy)silyl group bonded to the silicon atom via carbon atom or carbon and oxygen atoms, or a fluorine-containing organic group is prepared, this composition is readily curable by heating at a temperature lower than 100° C., and the cured product exhibits strong adhesion to a metal, inorganic, and plastic substrate as well as excellent adhesion durability at a temperature of up to 150° C. The present invention has been completed on the bases of such finding.

In view of the situation as described above, the present invention provides a thermosetting fluoropolyether adhesive composition and a method for adhesion with a metal, inorganic, or plastic substrate.

[1] A thermosetting fluoropolyether adhesive composition comprising (A) 100 parts by weight of a straight chain polyfluoro compound represented by the following general formula (1):

  (1)

wherein X is —CH$_2$—, —CH$_2$O—, —CH$_2$OCH$_2$—, or —Y—NR$^1$—CO— (wherein Y is —CH$_2$— or an o-, m-, or p-dimethylsilylphenylene group represented by the structural formula (2):

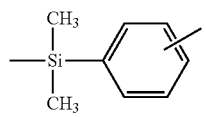  (2)

R$^1$ is hydrogen atom or a substituted or unsubstituted monovalent hydrocarbon group), X' is —CH$_2$—, —OCH$_2$—, —CH$_2$OCH$_2$—, or —CO—NR$^1$—Y'— (wherein Y' is —CH$_2$— or an o-, m-, or p-dimethylsilylphenylene group represented by the following structural formula (3):

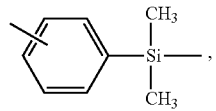  (3)

and R$^1$ is as defined above), a is independently 0 or 1, Rf$^1$ is a divalent perfluoropolyether group represented by the following general formula (4):

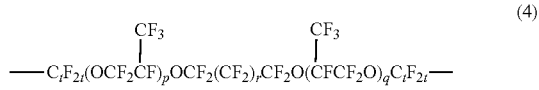  (4)

wherein p and q are independently an integer of 1 to 150, and sum of p and q on average is 2 to 300, and r is an integer of 0 to 6, and t is 2 or 3), or the following general formula or (5):

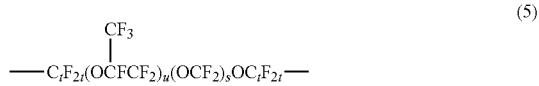  (5)

wherein u is an integer of 1 to 300, s is an integer of 1 to 80, and t is as defined above);

(B) a fluorine-containing organohydrogenpolysiloxane containing at least two hydrogen atoms directly bonded to the silicon atom (SiH group) per molecule, and having no other functional group in the molecule, at an amount such that the SiH group is 0.5 to 3.0 mole per mole of the alkenyl group in the component (A);

(C) a platinum group metal catalyst at an amount such that the platinum group metal atom is 0.1 to 500 ppm by weight of the component (A);

(D) 0.1 to 20 parts by weight of a fluorine-containing organohydrogenpolysiloxane containing a fluorine-containing organic group, hydrogen atom directly bonded to the silicon atom (SiH group), epoxy group and/or tri(organoxy)silyl group bonded to the silicon atom via carbon atom or carbon and oxygen atoms, and an aryl group bonded to the silicon atom via the carbon atom in one molecule;

(E) 0.01 to 5 parts by weight of an organic compound represented by the following general formula (6):

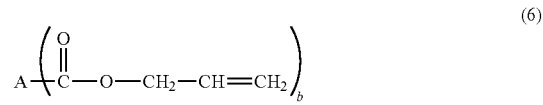  (6)

wherein A is a divalent to tetravalent group selected from —CH=CH—, —CH$_2$CH$_2$—, and

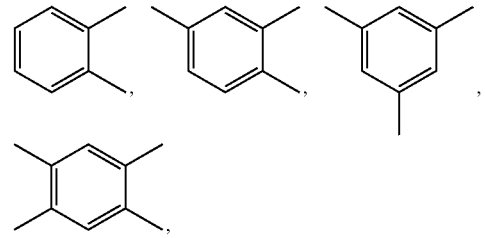

and b is valence of the group A, and (F) 0.01 to 5 parts by weight of an organosilicon compound having at least one epoxy group and at least one organoxy group directly bonded to the silicon atom in one molecule, and not containing hydrogen atom bonded to the silicon atom (SiH group) in the molecule, and (G) 0.01 to 10 parts by weight of an organosilicon compound having at least one hydrogen atom bonded to the silicon atom (SiH group) and at least one aryl group directly bonded to the silicon atom or bonded to the silicon atom via carbon atom or carbon and oxygen atoms in one molecule, and not containing epoxy group or a tri(organoxy)silyl group bonded to the silicon atom via carbon atom or carbon and oxygen atoms, or a fluorine-containing organic group.

[2] A thermosetting fluoropolyether adhesive composition according to the above [1] wherein content of the alkenyl group in the straight chain polyfluoro compound of component (A) is 0.002 to 0.3 mol/100 g.

[3] A thermosetting fluoropolyether adhesive composition according to the above [1] or [2] wherein the fluorine-containing organohydrogenpolysiloxane of component (B) has at least one monovalent perfluoroalkyl group, monovalent perfluoroxyalkyl group, divalent perfluoroalkylene group, or divalent perfluorooxyalkylene group per molecule.

[4] A thermosetting fluoropolyether adhesive composition according to any one of the above [1] to [3] wherein the fluorine-containing organic group in the component (D) is a monovalent fluorine-containing organic group at both ends and side chain of the molecular chain.

[5] A thermosetting fluoropolyether adhesive composition according to any one of the above [1] to [4] wherein the fluorine-containing organohydrogenpolysiloxane in the component (D) is the one having a monovalent perfluoroalkyl group bonded to the silicon atom via carbon atom or a monovalent perfluoroxyalkyl group bonded to the silicon atom via carbon and oxygen atoms.

[6] A thermosetting fluoropolyether adhesive composition according to any one of the above [1] to [5] wherein the component (D) is a fluorine-containing organohydrogenpolysiloxane represented by the following average compositional formula (7):

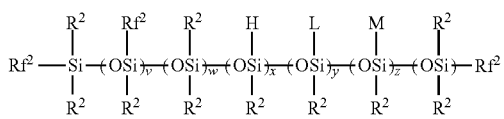

(7)

wherein $R^2$ is independently a substituted or unsubstituted monovalent hydrocarbon group, L is independently epoxy group and/or a tri(organoxy)silyl group bonded to the silicon atom via carbon atom or carbon and oxygen atoms, M is independently an aryl group bonded to the silicon atom via carbon atom, $Rf^2$ is independently a monovalent perfluoroalkyl group bonded to the silicon atom via carbon atom or a monovalent perfluoroxyalkyl group bonded to the silicon atom via carbon and oxygen atoms, v is a real number of $0<v\leq10.0$, w is a real number of $0<w\leq10.0$, x is a real number of $0<x\leq10.0$, y is a real number of $0<y\leq10.0$, and z is a real number of $0<z\leq10.0$ with the proviso that $0<v+w+x+y+z\leq30.0$.

[7] A thermosetting fluoropolyether adhesive composition according to any one of the above [1] to [6] wherein the component (E) is an aromatic polyhydric allyl ester compound selected from those represented by the following structural formulae:

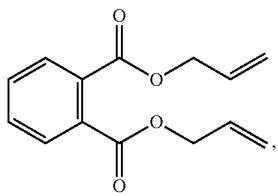

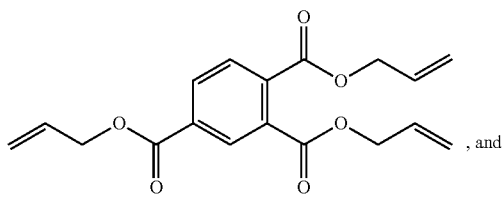
, and

[8] A method for adhering the thermosetting fluoropolyether adhesive composition of any one of the above [1] to [7] to a metal, inorganic, or plastic substrate, comprising the step of heating and curing the composition on the metal, inorganic, or plastic substrate at a temperature lower than 100° C.

The thermosetting fluoropolyether adhesive composition of the present invention cures by heating at a temperature lower than 100° C. and exhibits excellent adhesion to a metal, inorganic, or plastic substrate, and excellent adhesion durability at a temperature up to 150° C.

DETAILED DESCRIPTION OF THE INVENTION

Next, the present invention is described in detail.
Component (A)

The component (A) of the present invention is a straight chain polyfluoro compound represented by the following general formula (1):

$$CH_2=CH-(X)_a-Rf^1-(X')_a-CH=CH_2 \quad (1)$$

wherein X is $-CH_2-$, $-CH_2O-$, $-CH_2OCH_2-$, or $-Y-NR^1-CO-$ (wherein Y is $-CH_2-$ or an o-, m-, or p-dimethylsilylphenylene group represented by the structural formula (2):

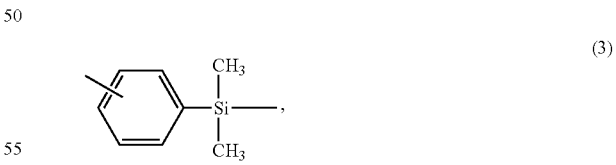

and $R^1$ is hydrogen atom or a substituted or unsubstituted monovalent hydrocarbon group), X' is $-CH_2-$, $-OCH_2-$, $-CH_2OCH_2-$, or $-CO-NR^1-Y'-$ (wherein Y' is $-CH_2-$ or an o-, m-, or p-dimethylsilylphenylene group represented by the following structural formula (3):

and $R^1$ is as defined above), a is independently 0 or 1, $Rf^1$ is a divalent perfluoropolyether group represented by the following general formula (4):

$$-C_tF_{2t}(OCF_2CF)_pOCF_2(CF_2)_rCF_2O(CFCF_2O)_qC_tF_{2t}- \quad (4)$$

wherein p and q are independently an integer of 1 to 150, and sum of p and q on average is 2 to 300, and r is an integer of 0 to 6, and t is 2 or 3), or the following general formula or (5):

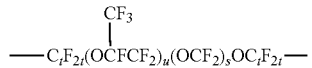
(5)

wherein u is an integer of 1 to 300, s is an integer of 1 to 80, and t is as defined above).

$R^1$ is preferably hydrogen atom or a monovalent hydrocarbon group containing 1 to 12 carbon atoms, and in particular, 1 to 10 carbon atoms. Examples include alkyl groups such as methyl group, ethyl group, propyl group, butyl group, hexyl group, cyclohexyl group, and octyl group; aryl groups such as phenyl group and tolyl group; aralkyl groups such as benzyl group and phenylethyl group; and substituted monovalent hydrocarbon groups wherein hydrogen atoms in any of such groups is entirely or partly substituted with a halogen atom such as fluorine.

The $Rf^1$ in the general formula (1) is a divalent perfluoropolyether structure represented by the following general formula (4):

(4)

wherein p and q are independently an integer of 1 to 150, and preferably 1 to 100, with the proviso that the sum of p and q on average is 2 to 300, preferably 2 to 200, and more preferably 10 to 150, r is an integer of 0 to 6, and t is an integer of 2 or 3), or the following general formula (5):

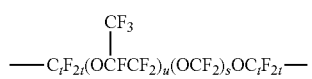
(5)

wherein u is an integer of 1 to 300, preferably 1 to 200, and more preferably 10 to 150, s is an integer of 1 to 80, and preferably 1 to 50, and t is as defined above.

Preferable examples of the $Rf^1$ group include those represented by the following formulae (i) to (iii):

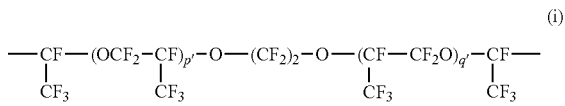
(i)

(wherein p' and q' are independently an integer of at least 1, preferably 1 to 150, and more preferably 1 to 100, p'+q' (average) is 2 to 300, preferably 2 to 200, and more preferably 10 to 150,

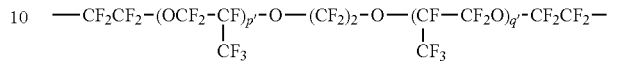
(ii)

wherein p' and q' are independently an integer of preferably 1 to 150 and more preferably 1 to 100, p'+q' (average) is 2 to 300, preferably 2 to 200, and more preferably 10 to 150), and

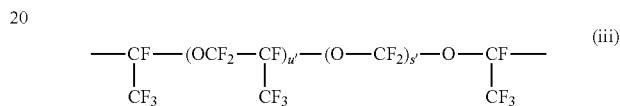
(iii)

wherein u' is an integer of 1 to 300, preferably 1 to 200, and more preferably 10 to 150; s' is an integer of 1 to 80, preferably 1 to 50, and more preferably 1 to 30. More preferably, the $Rf^1$ group is the divalent group having the structure of the formula (1).

Preferable examples of the component (A) include a compound represented by the following general formula (8):

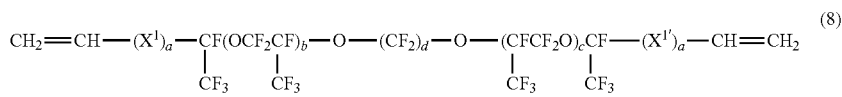
(8)

wherein $X^1$ is —$CH_2$—, —$CH_2O$—, —$CH_2OCH_2$—, or —Y—$NR^{1'}$—CO— (wherein Y is —$CH_2$— or o-, m-, or p-dimethylsilylphenylene group represented by the following structural formula (2):

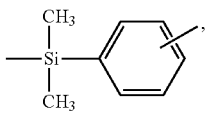
(2)

and $R^{1'}$ is hydrogen atom, methyl group, phenyl group, or allyl group), $X^{1'}$ is —$CH_2$—, —$OCH_2$—, —$CH_2OCH_2$—, or —CO—$NR^{1'}$—Y'— (wherein Y' is —$CH_2$— or an o-, m-, or p-dimethylsilylphenylene group represented by the following structural formula (3):

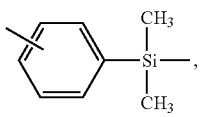
(3)

and $R^{1'}$ is as defined above), a is independently an integer of 0 or 1, d is an integer of 2 to 6, and b and c are independently an integer of 0 to 200, preferably 1 to 150, and more preferably 1 to 100, with the proviso that b+c (average) is 0 to 300, preferably 2 to 200, and more preferably 10 to 150.

Examples of the straight chain polyfluoro compound represented by the general formula (8) include those represented by the following formulae.

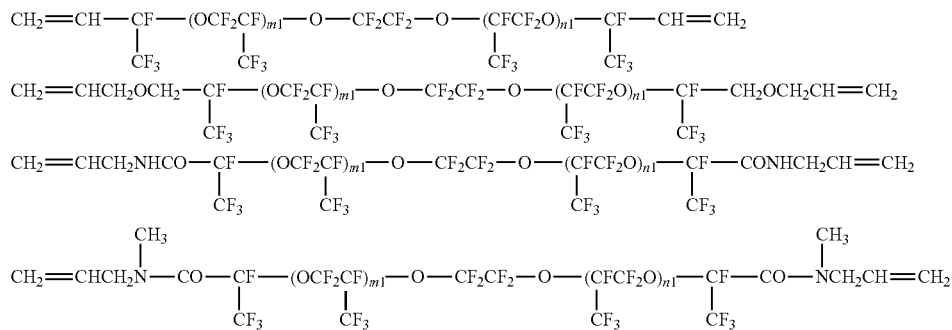

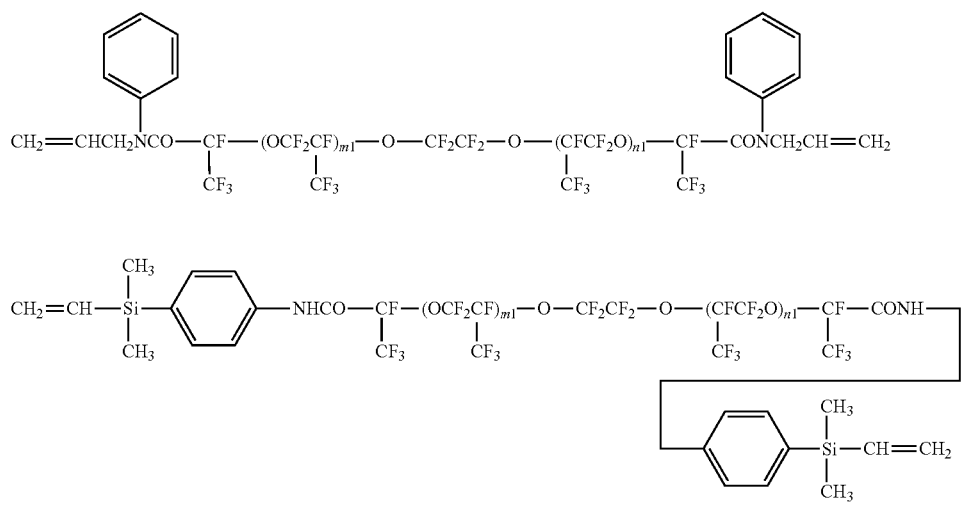

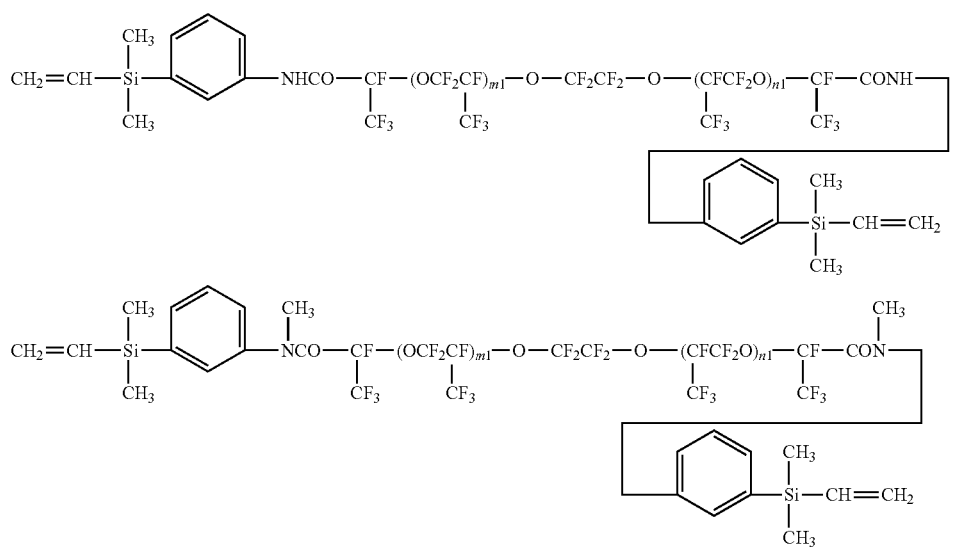

wherein m1 and n1 are independently an integer of 0 to 200, and preferably 1 to 150, m1+n1 is an integer of 2 to 300, and preferably 6 to 200.

The straight chain polyfluoro compound represented by the general formula (1) preferably has a viscosity (23° C.) as measured by JIS K6249 in the range of 100 to 100,000 mPa·s, more preferably 500 to 50,000 mPa·s, and still more preferably 1,000 to 20,000 mPa·s since the cured product has adequate physical properties when the composition of the present invention is used for sealing, potting, coating, impregnation, and the like. The most adequate viscosity suitable for the intended application may be selected within the viscosity as described above.

Content of the alkenyl group in the straight chain polyfluoro compound represented by the general formula (1) is preferably 0.002 to 0.3 mol/100 g, and more preferably 0.008 to 0.2 mol/100 g. Content of the alkenyl group in the straight chain polyfluoro compound of less than 0.002 mol/100 g is not preferable since degree of the crosslinking may be insufficient, and hence, curing may be insufficient. Content of the alkenyl group in excess of 0.3 mol/100 g is also not preferable since the cured article produced by using the composition may suffer from insufficient mechanical properties.

The straight chain polyfluoro compound may be used alone or in combination of two or more.

Component (B)

The component (B) is a fluorine-containing organohydrogenpolysiloxane containing at least 1, and preferably 1 to 20 fluorine-containing organic groups and at least 2 (generally 2 to about 100 hydrogen atoms), and preferably 3 to 50 hydrogen groups directly bonded to the silicon atom (namely, hydrosilyl groups represented by SiH) in one molecule and not containing other functional groups. The component (B) is preferably a fluorine-containing organohydrogenpolysiloxane containing at least one monovalent or divalent fluorine-containing organic group and at least 2 hydrogen atoms directly bonded to the silicon atom in one molecule, and not containing any functional group other than the SiH group such as epoxy group and/or tri(organoxy)silyl group bonded to the silicon atom via carbon atom or via carbon and oxygen atoms, and not containing an aryl group bonded to the silicon atom via carbon atom (for example, aralkyl group). The component (B) is most preferably a fluorine-containing organohydrogenpolysiloxane not containing an aryl group directly bonded to the silicon atom. The component (B) of the present invention functions as a crosslinking agent or a chain extender for the component (A), and in view of the compatibility with the component (A), dispersibility, and homogeneity after the curing, it preferably contains at least one fluorine-containing group such as monovalent perfluoroalkyl group, monovalent perfluorooxyalkyl group, divalent perfluoroalkylene group, and divalent perfluorooxyalkylene group in the molecule as a fluorine-containing organic group.

Examples of such monovalent or divalent fluorine-containing organic group include those represented by the following general formulae:

wherein g is an integer of 1 to 20, and preferably 2 to 10,

wherein f is an integer of 1 to 200, and preferably 2 to 100, and h is an integer of 1 to 3,

wherein i and j are independently an integer of at least 1 and preferably 1 to 100, average of i+j is 2 to 200, and preferably 2 to 100, and

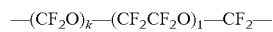

wherein k and l are independently an integer of 1 to 50, and preferably 1 to 30.

These perfluoroalkyl group, perfluoroxyalkyl group, perfluoroalkylene group, and perfluorooxyalkylene group may be bonded to the silicon atom via a divalent linkage group, and examples of the divalent linkage group include alkylene groups, arylene groups, combinations thereof, and these groups with the intervening oxygen atom (ether bond), amide bond, carbonyl bond, or ester bond. Exemplary such groups include those containing 2 to 12 carbon atoms such as —CH$_2$CH$_2$—,
—CH$_2$CH$_2$CH$_2$—,
—CH$_2$CH$_2$CH$_2$OCH$_2$—,
—CH$_2$CH$_2$CH$_2$—NH—CO—,
—CH$_2$CH$_2$C$_{1-12}$—N(Ph)-CO— (wherein Ph is phenyl group),
—CH$_2$CH$_2$C$_{1-12}$—N(CH$_3$)—CO—,
—CH$_2$CH$_2$CH$_2$—N(CH$_2$CH$_3$)—CO—,
—CH$_2$CH$_2$CH$_2$—N(CH(CH$_3$)$_2$)—CO—, and
—CH$_2$CH$_2$CH$_2$—O—CO—.

The monovalent or divalent fluorine-containing organic group and the monovalent substituent bonded to the silicon atom other than the hydrogen atom bonded to the silicon atom in the fluorine-containing organohydrogenpolysiloxane of the component (B) is a substituted or unsubstituted alkyl group or aryl group containing 1 to 20 carbon atoms, and preferably 1 to 12 carbon atoms, for example, an alkyl group such as methyl group, ethyl group, propyl group, butyl group, hexyl group, cyclohexyl group, octyl group, or decyl group or an aryl group such as phenyl group, tolyl group, or naphthyl group, or any one of these groups wherein all or a part of the hydrogen atoms thereof are substituted with a halogen atom such as chlorine atom, cyano group, or other substituent, for example, a substituted or unsubstituted monovalent hydrocarbon group containing 1 to 20 carbon atoms such as chloromethyl group, chloropropyl group, or cyanoethyl group.

The fluorine-containing organohydrogenpolysiloxane of the component (B) may be cyclic, straight-chain, three-dimensional network, or a combination thereof. The fluorine-containing organohydrogenpolysiloxane is not limited for its number of silicon atom. The number of the silicon atom, however, is generally 2 to about 60, and preferably 3 to about 30.

Examples of such component (B) having a monovalent or divalent fluorine-containing organic group and the hydrogen atoms bonded to the silicon atom include the compounds as shown below. These compounds may be used either alone or in combination of two or more. In the following formulae, Me represents methyl group, and Ph represents phenyl group.

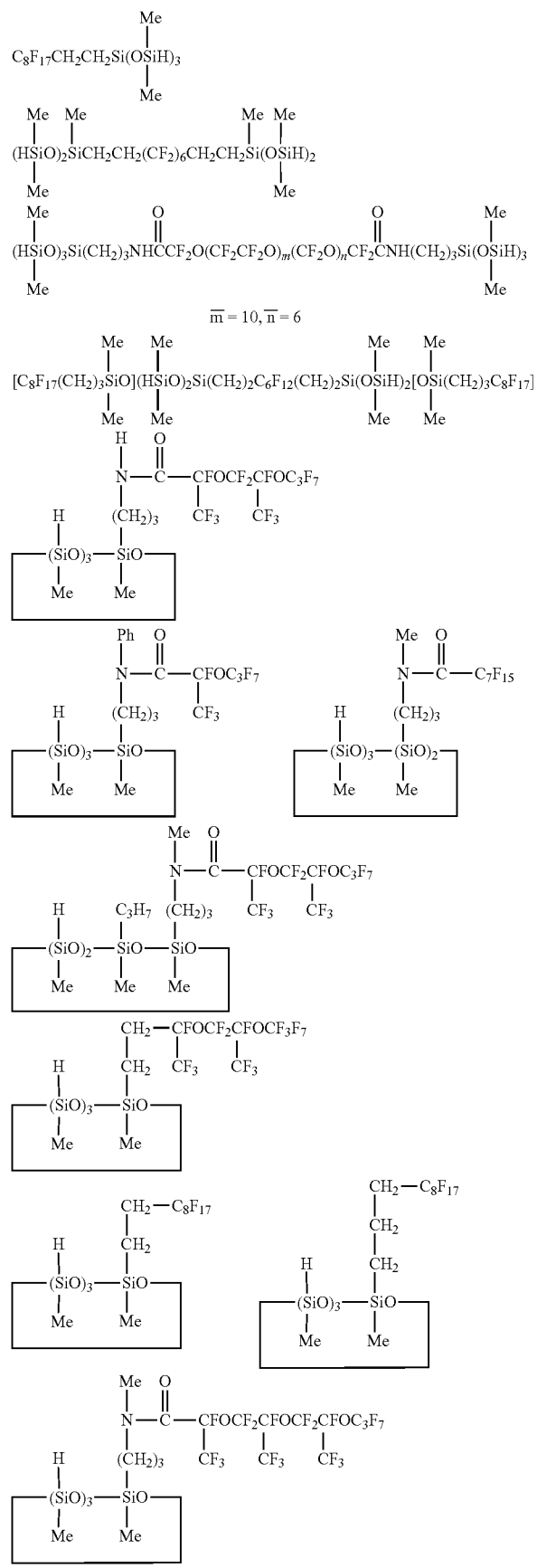

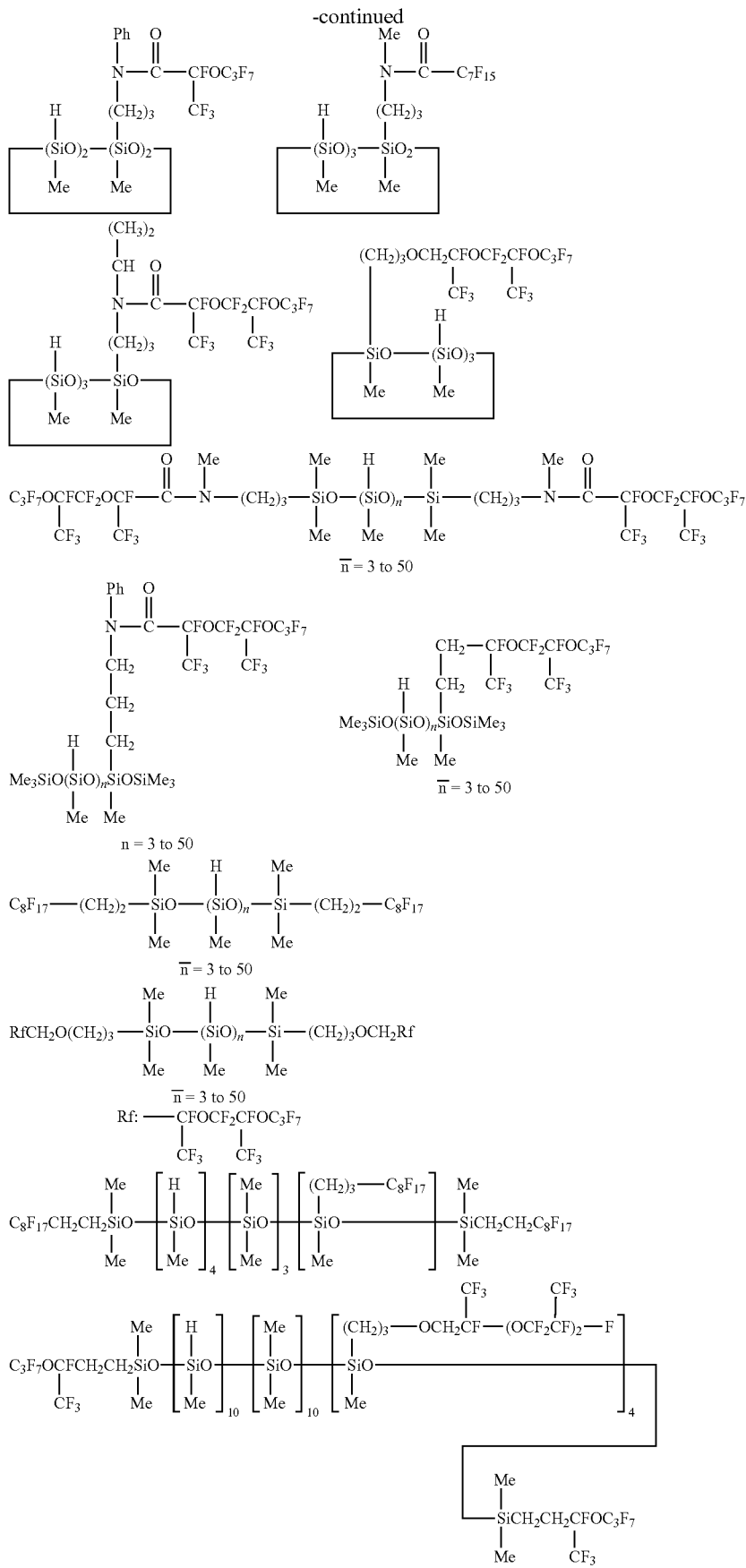

-continued

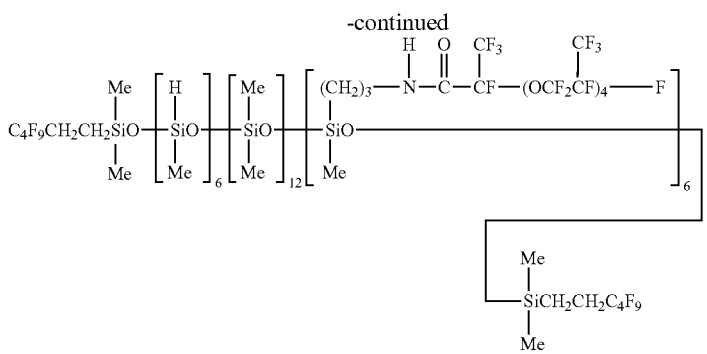

15

The component (B) may comprise a single compound or a combination of two or more compounds.

The component (B) may be incorporated at an amount such that hydrosilyl group, namely, SiH group in the component (B) is 0.5 to 3.0 mole, and more preferably 0.8 to 2.0 mole in relation to 1 mole of the alkenyl group such as vinyl group, allyl group, and cycloalkenyl group in the component (A).

In the present invention, the component (B) is preferably used so that the total of the SiH group in the component (B) and the components (D) and (G) as described below is 0.2 to 10 mole, and in particular, 0.3 to 5 mole in relation to 1 mole of the total alkenyl group in the component (A) and the component (E) as described below.

Component (C)

The platinum group metal catalyst which is component (C) of the present invention is a hydrosilylation catalyst. The hydrosilylation catalyst is a catalyst which promotes addition between the alkenyl group in the composition, and in particular the alkenyl group in the component (A) with the hydrosilyl group (SiH group) in the composition, and in particular the hydrosilyl group in the component (B). A noble metal or its compound is generally used for the hydrosilylation catalyst, and because of the high price, platinum and platinum compounds which are relatively readily available are commonly used for the hydrosilylation catalyst.

Exemplary platinum compounds include chloroplatinic acid or a complex of the chloroplatinic acid with an olefin such as ethylene, a complex with an alcohol or vinylsiloxane, metal platinum supported on silica, alumina, or carbon. Exemplary platinum group metal catalysts other than the platinum and its compound include rhodium, ruthenium, iridium, palladium compounds such as RhCl(PPh$_3$)$_3$, RhCl(CO)(PPh$_3$)$_2$, Ru$_3$(CO)$_{12}$, IrCl(CO)(PPh$_3$)$_2$, and Pd(PPh$_3$)$_4$ wherein Ph represents phenyl group.

In using these catalysts, the catalyst may be used in solid state when the catalyst is a solid catalyst. However, in order to improve homogeneity of the cured article, the chloroplatinic acid or its catalyst may be used after dissolving in an adequate solvent such as toluene or ethanol and dissolving the straight chain polyfluoro compound of the component (A) in the common solvent.

The component (C) may be incorporated at the catalytic amount of the hydrosilylation catalyst. However, the amount may be adequately adjusted depending on the desired curing speed, and typically, the component (C) is used at 0.1 to 500 ppm, and in particular, at 0.5 to 200 ppm (in terms of the platinum group metal atom) of the component (A).

Component (D)

Component (D) of the present invention is a fluorine-containing organohydrogenpolysiloxane containing a fluorine-containing organic group which is preferably located at both ends and side chain of the molecular chain, hydrogen atom directly bonded to the silicon atom (SiH group), epoxy group and/or tri(organoxy)silyl group bonded to the silicon atom via carbon atom or carbon and oxygen atoms, and an aryl group bonded to the silicon atom via the carbon atom in one molecule. The component (D) is an adhesion-imparting component which imparts self-adhesive property with the composition of the present invention.

In view of the compatibility with the component (A), dispersibility, and homogeneity after the curing, the fluorine-containing organic group of the component (D) of the present invention is more preferably the one having a monovalent perfluoroalkyl group bonded to the silicon atom via carbon atom or a monovalent perfluoroxyalkyl group bonded to the silicon atom via carbon and oxygen atoms.

The fluorine-containing organohydrogenpolysiloxane of the component (D) is preferably the one represented by the following average compositional formula (7):

(7)

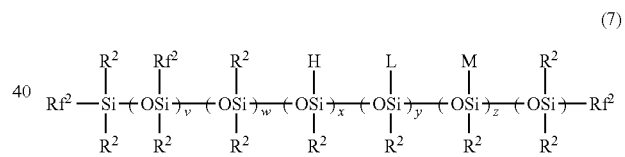

wherein $R^2$ is independently a substituted or unsubstituted monovalent hydrocarbon group, L is independently epoxy group and/or a tri(organoxy)silyl group such as a trialkoxysilyl group bonded to the silicon atom via carbon atom or carbon and oxygen atoms, M is independently an aryl group bonded to the silicon atom via carbon atom (for example, an aralkyl group), $Rf^2$ is independently a monovalent perfluoroalkyl group bonded to the silicon atom via carbon atom or a monovalent perfluoroxyalkyl group bonded to the silicon atom via carbon and oxygen atoms, v is a real number of $0<v\leq10.0$, and preferably $0<v\leq5.0$, w is a real number of $0<w\ 10.0$, and preferably $0<w\leq5.0$, x is a real number of $0<x\leq10.0$, and preferably $0<x\leq5.0$, y is a real number of $0<y\leq10.0$, and preferably $0<y\leq5.0$, z is a real number of $0<z\leq10.0$, and preferably $0<z\leq5.0$, with the proviso that $0<v+w+x+y+z\leq30.0$, and preferably $0<v+w+x+y+z\leq20.0$.

In the formula (7), v, w, x, y, and z, which are the number of repetitive siloxane units, and v+w+x+y+z are integers for each molecule. However, when the fluorine-containing organohydrogenpolysiloxane of the component (D) is described as an average compositional formula, they represent the real number calculated from the integral value of $^1$H-NMR spectrum. (This also applies to the following description).

The substituted or unsubstituted monovalent hydrocarbon group $R^2$ is preferably the one containing 1 to 10 carbon atoms, and in particular, 1 to 8 carbon atoms, and more preferably, the one which is not an aralkyl group such as benzyl group or phenylethyl group. Examples of such $R^2$ include alkyl groups such as methyl group, ethyl group, propyl group, butyl group, hexyl group, cyclohexyl group, and octyl group, and substituted monovalent hydrocarbon group wherein a part or all of the hydrogen atoms in any of the above-mentioned groups have been substituted with a halogen atom such as fluorine. The most preferred is methyl group.

L is epoxy group and/or a tri(organoxy)silyl group such as a trialkoxysilyl group bonded to the silicon atom via carbon atom or via carbon and oxygen atoms. Examples of the L include the groups represented by the following formulae:

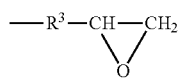

wherein $R^3$ is a divalent hydrocarbon group containing 1 to 10, and preferably, 1 to 5 carbon atoms with or without intervening oxygen such as an alkylene group such as methylene group, ethylene group, propylene group, butylene group, hexylene group, cyclohexylene group, or octylene group, a cycloalkylene group such as cyclohexylene group, or an oxyalkylene group such as oxyethylene group, oxypropylene group, or oxybutylene group, and

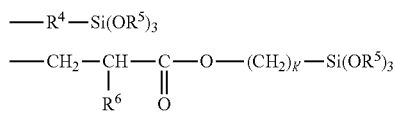

wherein $R^4$ is a divalent hydrocarbon group carbon atom containing 1 to 10, and preferably 1 to 4 carbon atoms such as alkylene group such as methylene group, ethylene group, propylene group, butylene group, hexylene group, cyclohexylene group, or octylene group; $R^5$ is a monovalent hydrocarbon group containing 1 to 8 and preferably 1 to 4 carbon atoms optionally containing a carbonyl group such as an alkyl group such as methyl group, ethyl group, n-propyl group, isopropyl group, n-butyl group, isobutyl group, or tert-butyl group, an acyl group such as acetyl group, or an aryl group such as phenyl group; $R^6$ is hydrogen atom or methyl group; and k' is an integer of 2 to 10, and preferably 2 to 6.

Examples of L include those represented by the following formulae:

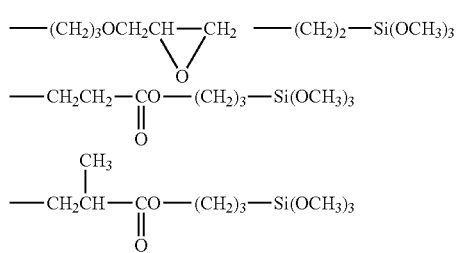

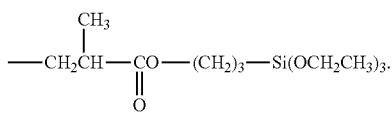

M is an aryl group bonded to the silicon atom via carbon atom (for example, an aralkyl group). Exemplary aryl groups include phenyl group, tolyl group, xylyl group, and naphthyl group, and the preferred is phenyl group. M is preferably the group represented by the following formula:

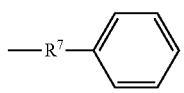

wherein $R^7$ is a substituted or unsubstituted divalent hydrocarbon group containing 1 to 10, and preferably 1 to 4 carbon atoms such as an alkylene group such as methylene group, ethylene group, propylene group, butylene group, hexylene group, cyclohexylene group, or octylene group, or a substituted divalent hydrocarbon group wherein a part or all of the hydrogen atoms in any of the above-mentioned groups have been substituted with an alkyl group such as methyl group or ethyl group.

Examples of M include those represented by the following formulae:

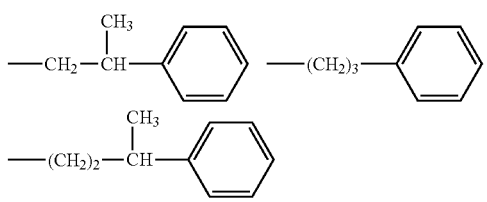

$Rf^2$ is a monovalent perfluoroalkyl group bonded to the silicon atom via carbon atom or a monovalent perfluoroxyalkyl group bonded to the silicon atom via carbon and oxygen atoms. Examples of the monovalent perfluoroalkyl group and the monovalent perfluoroxyalkyl group ($Rf^2$) include those represented by the following general formulae:

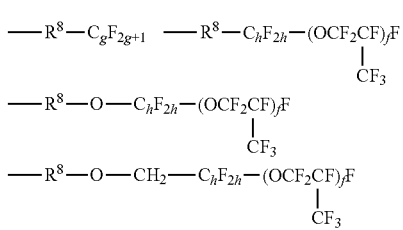

wherein $R^8$ is a divalent hydrocarbon group containing 1 to 10, and preferably 1 to 4 carbon atom, for example, an alkylene group such as methylene group, ethylene group, or propylene group; g is an integer of 1 to 20, and preferably 2 to 10; f is an integer of 2 to 200, and preferably 2 to 100; and h is an integer of 1 to 3.

Examples of Rf² include those represented by the following formulae:
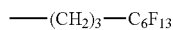
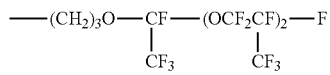
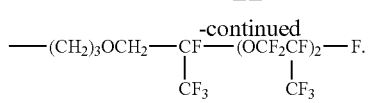
Examples of the fluorine-containing organohydrogenpolysiloxane used as the component (D) include those represented by the following average compositional formulae. These compounds may be used alone or in combination of two or more. In the following formulae, Me represents methyl group.
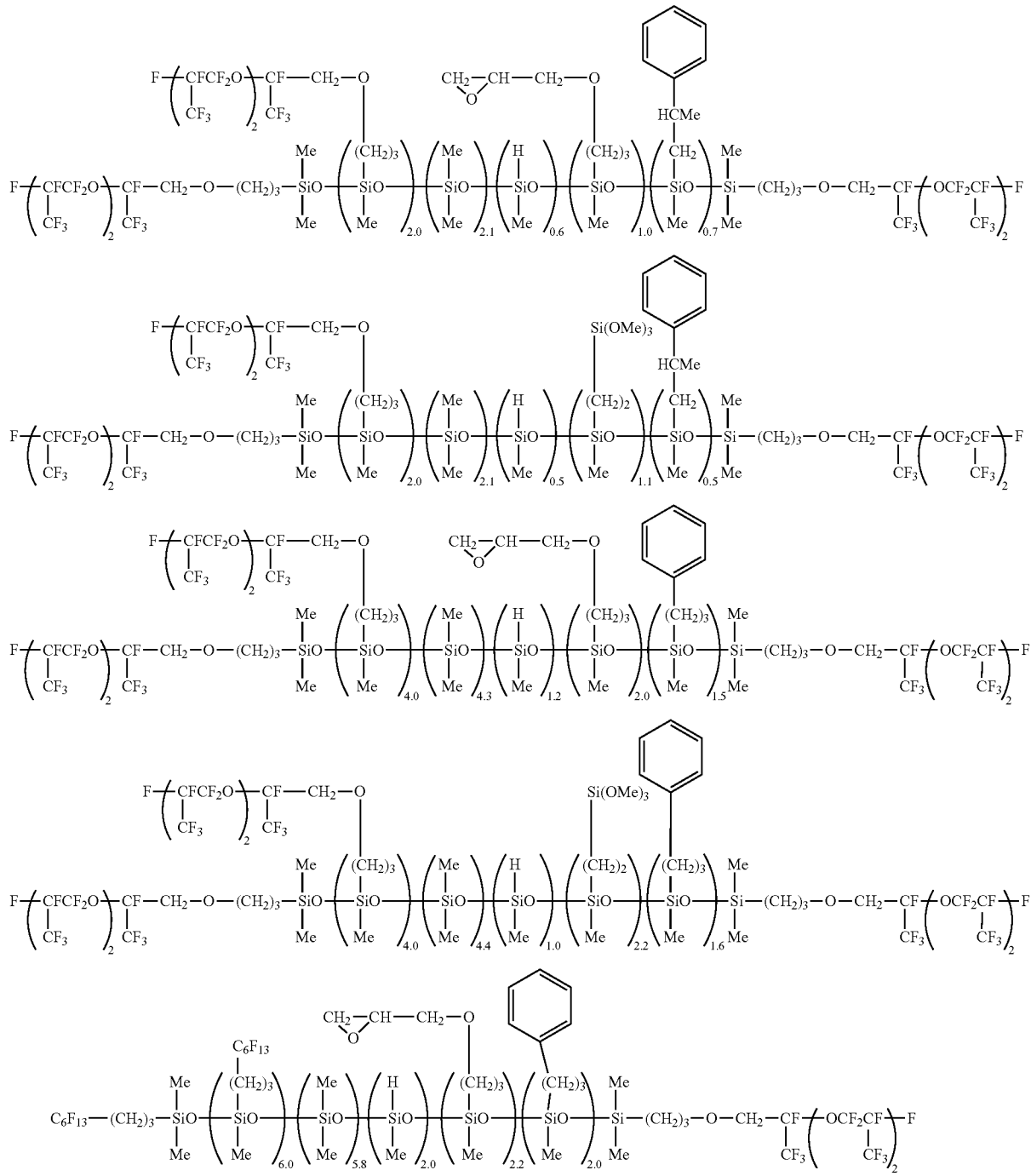

-continued

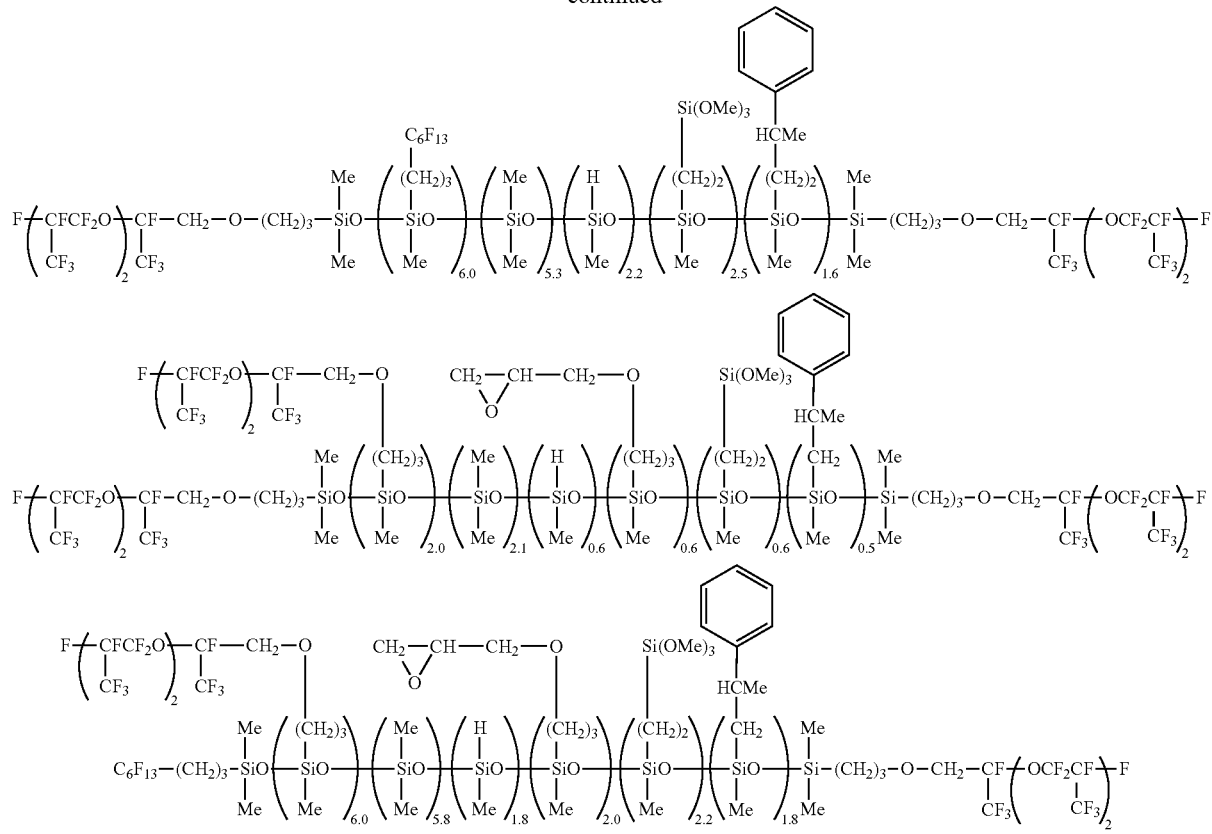

The component (D) may comprise a single compound or a combination of two or more compounds.

The component (D) may be used at an amount of 0.1 to 20 parts by weight, and preferably 1.0 to 15 parts by weight in relation to 100 parts by weight of the component (A). Sufficient adhesion is not realized at an amount of the component (D) of less than 0.1 part by weight. At an amount in excess of 20 parts by weight, the composition will exhibit poor flowability, and the resulting cured article will suffer from an insufficient physical strength.

Component (E)

The component (E) of the present invention is a component added for the purpose of markedly improving adhesion of the composition of the present invention to a metal or plastic substrate after curing the composition at a temperature of less than 100° C., and the component (E) is a compound (polyhydric allyl ester compound) represented by the following general formula (6):

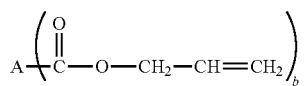
(6)

wherein A is a divalent to tetravalent group selected from —CH=CH—, —CH$_2$CH$_2$—,

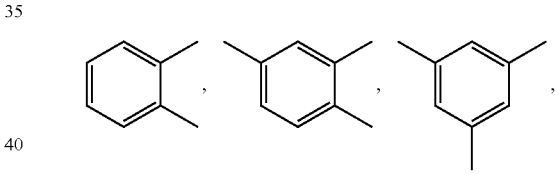

and b is the valence of the group A.

Preferable examples of the compound represented by the general formula (6) include the aromatic polyhydric allyl ester compound having a benzene ring represented by the following structural formulae:

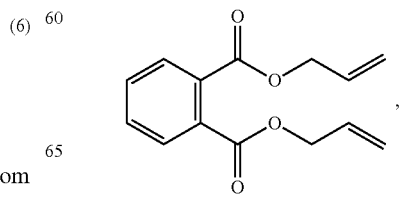

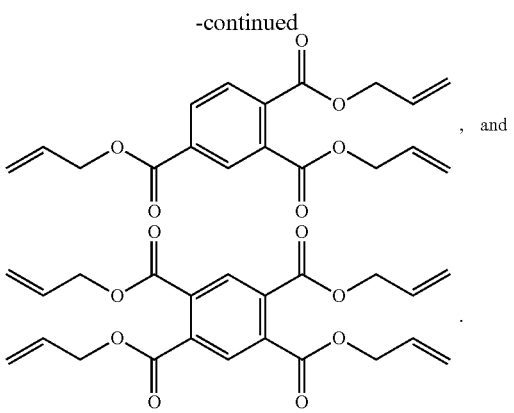

, and

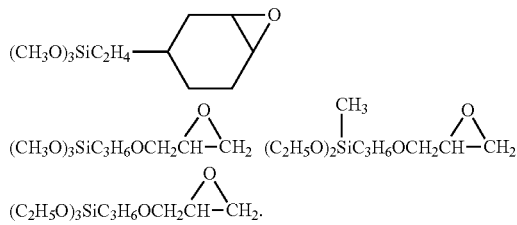

This component (E) may comprise a single compound or a combination of two or more compounds.

The component (E) may be used at an amount of 0.01 to 5 parts by weight, and preferably 0.1 to 3 parts by weight in relation to 100 parts by weight of the component (A). Sufficient adhesion is not realized at an amount of the component (E) of less than 0.01 part by weight. At an amount in excess of 5 parts by weight, the composition will exhibit poor flowability, and the resulting cured article will suffer from an insufficient physical strength, and the storage stability of the composition may also become insufficient.

Component (F)

The component (F) of the present invention is an organosilicon compound having at least one, preferably 1 to 10, and more preferably 1 to 6 epoxy groups and at least one, preferably 1 to 10, and more preferably 1 to 6 organoxy group directly bonded to the silicon atom in one molecule, and not containing hydrogen atom bonded to the silicon atom (SiH group) in the molecule. This component is an adhesion-imparting component which imparts self-adhesive property with the composition of the present invention.

The epoxy group is preferably the one which is bonded to the silicon atom via carbon atom or via carbon and oxygen atoms. Examples of the carbon atoms which may be bonded via oxygen atom include a divalent hydrocarbon group containing 1 to 10, and preferably 1 to 5 carbon atoms, such as alkylene group such as methylene group, ethylene group, propylene group, butylene group, hexylene group, cyclohexylene group, or octylene group, cycloalkylene group such as cyclohexylene group, and oxyalkylene group such as oxyethylene group, oxypropylene group, or oxybutylene group. Among these, the preferred are ethylene group and oxypropylene group.

Of the organoxy group, examples of the alkoxy group include those containing 1 to 10, and preferably 1 to 6 carbon atoms such as methoxy group, ethoxy group, propoxy group, isopropoxy group, butoxy group, isobutoxy group, and tert-butoxy group. Examples of the organoxy group other than the alkoxy group include acyloxy groups such as acetoxy group and aryloxy groups such as phenoxy group. Among these, the preferred are lower alkoxy groups such as methoxy group and ethoxy group.

Examples of the component (F) include alkoxysilane compounds having an epoxy functional group such as γ-glycidyloxypropyl group or β-(3,4-epoxycyclohexyl)-ethyl group as shown below.

The component (F) may comprise a single compound or a combination of two or more compounds.

The component (F) may be used at an amount of 0.01 to 5 parts by weight, and preferably 0.1 to 3 parts by weight in relation to 100 parts by weight of the component (A). Sufficient adhesion is not realized at an amount of the component (F) of less than 0.01 part by weight. At an amount in excess of 5 parts by weight, the composition will exhibit poor flowability, and the resulting cured article will suffer from an insufficient physical strength.

Component (G)

The component (G) of the present invention contains at least one, preferably 1 to 20, and more preferably 1 to 10 hydrogen atoms directly bonded to the silicon atom (SiH group) and at least one, preferably 1 to 10, and more preferably 1 to 5 aryl groups bonded to the silicon atom either directly or via carbon atom in one molecule, and the component (G) does not contain epoxy group or tri(organoxy)silyl group bonded to the silicon atom via carbon atom or carbon and oxygen atoms or the fluorine-containing organic group. The component (G) is a component incorporated in the composition for the purpose of imparting adhesion durability at a temperature of up to 150° C. to the cured article produced from the composition of the present invention by heating the composition at a temperature of less than 100° C.

The aryl group is preferably the one containing 6 to 30, and more preferably 6 to 18 carbon atoms such as phenyl group, tolyl group, xylyl group, naphthyl group, and biphenylyl group. Among these, the preferred is phenyl group.

The carbon atom(s) connecting the silicon atom and the aryl group is preferably a substituted or unsubstituted divalent hydrocarbon group containing 1 to 10, and more preferably 1 to 4 carbon atoms. Examples include alkylene groups such as methylene group, ethylene group, propylene group, butylene group, hexylene group, cyclohexylene group, and octylene group, and substituted divalent hydrocarbon groups wherein a part or all of the hydrogen atoms in any one of these groups have been substituted with an alkyl group such as methyl group and ethyl group. Among these, the preferred are propylene groups (trimethylene group and methylethylene group).

The organosilicon compound of the component (G) is preferably silane, disilane, trisilane, disiloxane, trisiloxane, and cyclotetrasiloxane compounds.

Examples of such component (G) include the compounds represented by the following formulae:

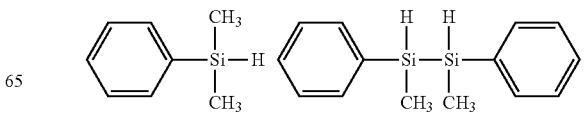

-continued

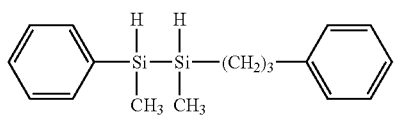
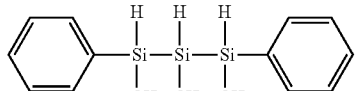
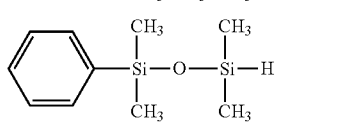
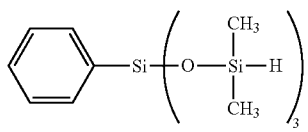
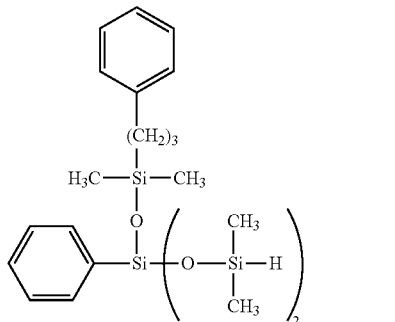
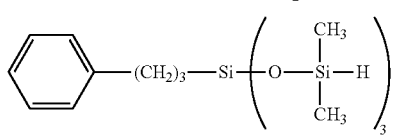
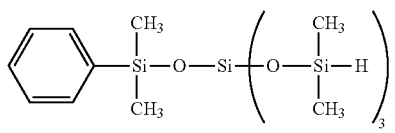
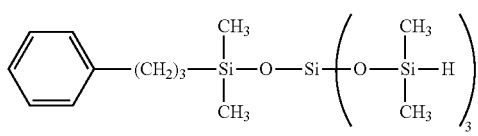
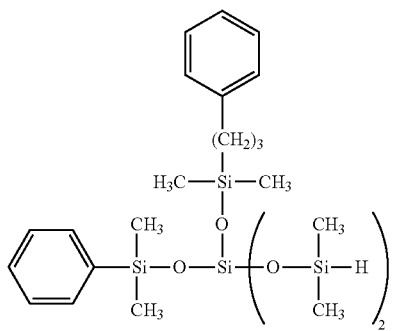

-continued

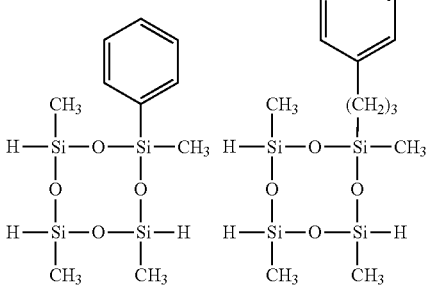
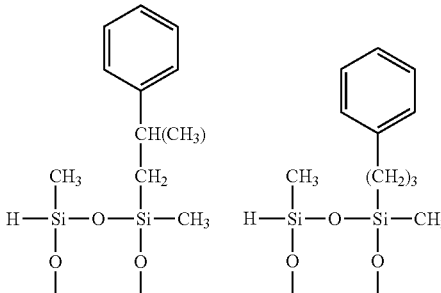

The component (G) may comprise a single compound or a combination of two or more compounds.

The component (G) may be used at an amount of 0.01 to 10 parts by weight, and preferably 0.03 to 5 parts by weight in relation to 100 parts by weight of the component (A). Sufficient adhesion is not realized at an amount of the component (G) of less than 0.01 part by weight. At an amount in excess of 10 parts by weight, the composition will exhibit poor flowability, and the resulting cured article will suffer from an insufficient physical strength.

Other Components

To the thermosetting fluoropolyether adhesive composition of the present invention, various additives such as plasticizer, viscosity adjusting agent, plasticity-imparting agent, inorganic filler, reaction controller, adhesion accelerator may be added in addition to the components (A) to (G) as described above in order to improve utility of the composition. These additives may be used at any amount not adversely affecting the merits of the present invention, the characteristic features of the composition, and physical properties of the cured product.

Compounds which may be used alone or in combination for the plasticizer, viscosity adjusting agent, and plasticity-imparting agent include the polyfluoromonoalkenyl compound represented by the following general formula (9):

$$Rf^3\text{-}(X')_a CH=CH_2 \qquad (9)$$

wherein X' and a are as defined above for the formula (1), and $Rf^3$ is a group represented by the following general formula (12):

(12)

wherein f' is an integer of at least 1, preferably 1 to 100, and more preferably 1 to 50, h' is 2 or 3, and smaller than any of the sums related to the $Rf^1$ group of the component (A), namely, the p'+q' (average), the sum of u' and s', and the sum of b to d of $Rf^1$ group; and/or a straight chain polyfluoro compound represented by the following general formula (10) or (11):

$$D-O-(CF_2CF_2CF_2O)_{c'}-D \qquad (10)$$

wherein D is a group represented by the formula: $C_{b'}F_{2b'+1}$— (wherein b' is 1 to 3), c' is an integer of 1 to 200, and preferably 2 to 100, and smaller than any of the sums related to the $Rf^1$ group of the component (A), namely, the p'+q' (average), the sum of u' and s', and the sum of b to d of $Rf^1$ group; or $$D-O-(CF_2O)_{d'}(CF_2CF_2O)_{e'}-D \qquad (11)$$

wherein D is as defined above, d' and e' are independently an integer of 1 to 200 and preferably 1 to 100, and smaller than any of the sums related to the $Rf^1$ group of the component (A), namely, the p'+q' (average), the sum of u' and s', and the sum of b to d of $Rf^1$ group.

Examples of the polyfluoromonoalkenyl compound represented by the general formula (9) include those represented by the following formulae wherein m2 satisfies the requirements as described above.

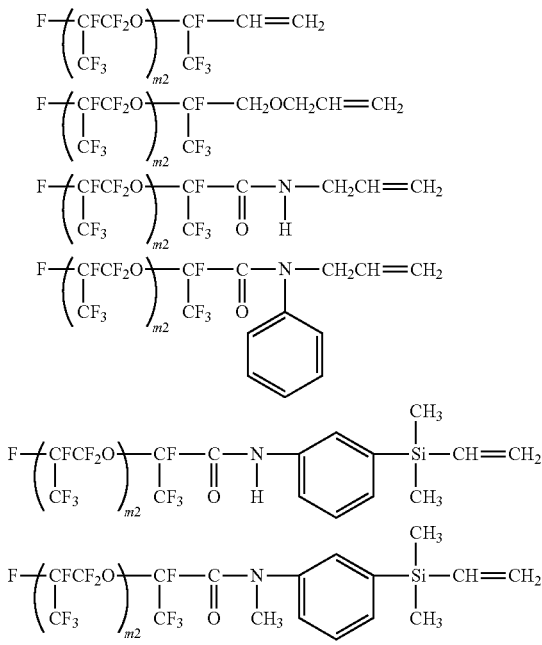

Examples of the straight chain polyfluoro compound represented by the general formulae (10) and (11) include the compounds represented by the following formulae wherein n3 and the sum of n3 and m3 satisfy the requirements as described above.

$$CF_3O-(CF_2CF_2CF_2O)_{n3}-CF_2CF_3$$

$$CF_3-[(OCF_2CF_2)_{n3}(OCF_2)_{m3}]-O-CF_3$$

wherein m3+n3 is 2 to 201, m3 is 1 to 200, and n3 is 1 to 200.

The polyfluoro compound represented by the general formula (9) to (11) preferably has a viscosity (23° C.) of 5 to 100,000 mPa·s, and preferably 50 to 50,000 mPa·s when measured as in the case of component (A).

When the polyfluoro compound represented by the general formula (9) to (11) is added, the compound may be preferably added at an amount of 1 to 300 parts by weight, and more preferably at 50 to 250 parts by weight in relation to 100 parts by weight of the component (A).

Exemplary inorganic fillers include reinforcement and quasi-reinforcement fillers such as fumed silica, colloidal silica, quartz powder, molten quartz powder, diatomaceous earth, and calcium carbonate having a specific surface area measured by BET method of at least 50 $m^2/g$ (typically 50 to 400 $m^2/g$), and preferably about 100 to 350 $m^2/g$ [preferably used at 0.1 to 50 parts by weight, and preferably 1 to 25 parts by weight in relation to 100 parts by weight of the Component (A)], inorganic pigments such as titanium oxide, iron oxide, carbon black, and cobalt aluminate, heat resistance-improving agent such as titanium oxide, iron oxide, carbon black, cerium oxide, cerium hydroxide, zinc carbonate, magnesium carbonate, and manganese carbonate, thermal conductance imparting agent such as alumina, boron nitride, silicon carbide, and metal powder.

Examples of the reagent for controlling the hydrosilylation catalyst include acetylene alcohols such as 1-ethynyl-1-hydroxycyclohexane, 3-methyl-1-butyn-3-ol, 3,5-dimethyl-1-hexyn-3-ol, 3-methyl-1-penten-3-ol, and phenyl butynol, reaction products of chlorosilane having the monovalent fluorine-containing organic group with the acetylene alcohol, 3-methyl-3-penten-1-in, 3,5-dimethyl-3-hexen-1-in, triallyl isocyanurate, polyvinylsiloxane, and organophosphorus compounds, and addition of such component enables adequate maintenance of the curing reactivity and storage stability.

An adhesion accelerator such as carboxylic anhydride and titanate ester may also be added.

The thermosetting fluoropolyether adhesive composition of the present invention is not limited for its production method, and the composition can be produced by kneading the components (A) to (G) and other optionally added components. The apparatus used in the kneading may be selected from planetary mixer, Ross mixer, Hobart mixer, and other mixers and kneader, three rolls, and other kneaders.

Depending on the intended used, the thermosetting fluoropolyether adhesive composition of the present invention may be constituted as a so-called one-part composition wherein all of the components (A) to (G) and other optional components are treated as one integral composition, or as a two-part composition and mixed immediately before the use.

The conditions used for the curing of the thermosetting fluoropolyether adhesive composition of the present invention is not particularly limited as long as the temperature is in the range of not less than 10° C. and lower than 100° C. The temperature is preferably not lower than 20° C. and lower than 100° C., and more preferably not lower than 50° C. and lower than 100° C. In such a case, an adequate curing time may be selected so that the crosslinking reaction and the adhesion reaction with the substrate can be completed. The time, however, is typically in the range of 30 minutes to 30 hours, more preferably 30 minutes to 25 hours, and still more preferably 30 minutes to 20 hours.

The thus produced thermosetting fluoropolyether adhesive composition of the present invention exhibits excellent adhesion to a substrate of a metal such as aluminum, an inorganic material such as alumina ceramics, or a plastic such as polybuthylene terephthalate (PBT) resin or polyphenylene sulfide (PPS) resin when cured by heating to a temperature of lower than 100° C., and also, the cured product exhibits excellent adhesion durability at a temperature of up to 150° C. Accordingly, the composition is useful as an adhesive in the applications such as electrical and electronic parts and parts mounted on motor vehicles. More specifically, applications around the electrical and electronic parts include moisture-resistant and water-resistant protective sealing and coating in a motor for electric vehicle, mobile equipment, piezoelectric device, mounting board for outdoor equipment and electrode; electrolyte-resistant protective sealing and coating in a lithium secondary battery, electrolytic capacitor, and dye sensitized solar battery; and solvent-resistant and oil-resistant protective sealing and potting in an inkjet printer for professional use and semiconductor apparatus. Applications around the parts mounted on motor vehicles include protective sealing and potting in a gas pressure sensor, liquid pressure sensor, temperature sensor, humidity sensor, rotation sensor, G sensor, timing sensor, air flow meter, electronic circuit, semiconductor module, and various control units.

In using the thermosetting fluoropolyether adhesive composition of the present invention, the composition may be dissolved in a fluorine-based solvent adequately selected for the intended use and object. Exemplary fluorine-based solvents include 1,3-bis(trifluoromethyl)benzene, Florinert (manufactured by 3M), perfluorobutylmethyl ether, and perfluorobutylethyl ether. Use of such solvent is particularly preferable in the applications such as thin film coating.

EXAMPLES

Next, the present invention is described in further detail by the following Examples and the Comparative Examples, which by no means limit the scope of the present invention. In the following Examples, "part" means part by weight, "Me" means methyl group, viscosity is the value measured at 23° C. according to JIS K6249, and average degree of polymerization (average number of the repetitive unit) in the formulae (13) and (14) is the number average in the measurement of the molecular weight distribution in terms of polystyrene by gel permeation chromatography (GPC), and repetitive number of the siloxane unit in the formulae (16) and (21) is the number actually measured as the number average calculated from integrated value in $^1$H-NMR spectroscopy.

Example 1

To 100 parts of the polymer (viscosity, 10,000 mPa·s; vinyl group content, 0.012 mole/100 g) represented by the following formula (13), 5.0 parts of hydrophobicized fumed silica R-976 (product name, manufactured by Nippon Aerosil Co., Ltd. having a BET specific area of 250 m$^2$/g), 1.2 parts of fluorine-containing organohydrogenpolysiloxane (SiH group content, 0.0067 mole/g) represented by the following formula (14), 1.8 parts of fluorine-containing organohydrogenpolysiloxane (SiH group content, 0.0039 mole/g) represented by the following formula (15), 0.35 part of toluene solution of platinum-divinyltetramethyldisiloxane complex (platinum concentration, 0.5% by weight), 7.0 parts of the fluorine-containing organohydrogenpolysiloxane represented by the following average compositional formula (16), 0.25 part of the organic compound represented by the following formula (17), 0.20 part of the organosilicon compound represented by the following formula (18), 0.10 part of the organosilicon compound represented by the following formula (19), and 0.10 part the composition represented by the following formula (20) were added in this order. The mixture was stirred until the mixture became homogeneous, and then, the mixture was defoamed to prepare the composition.

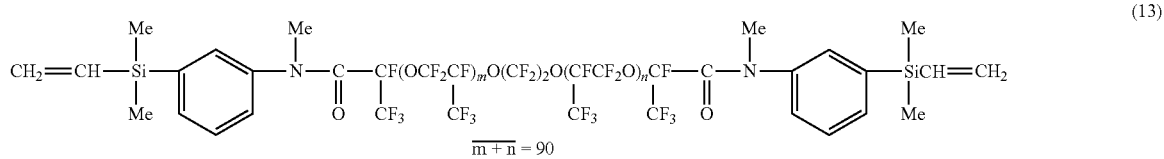

(13)

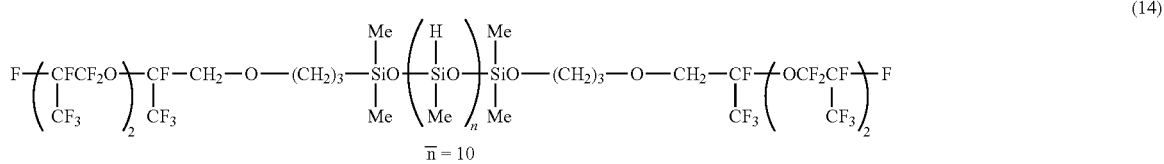

(14)

(15)

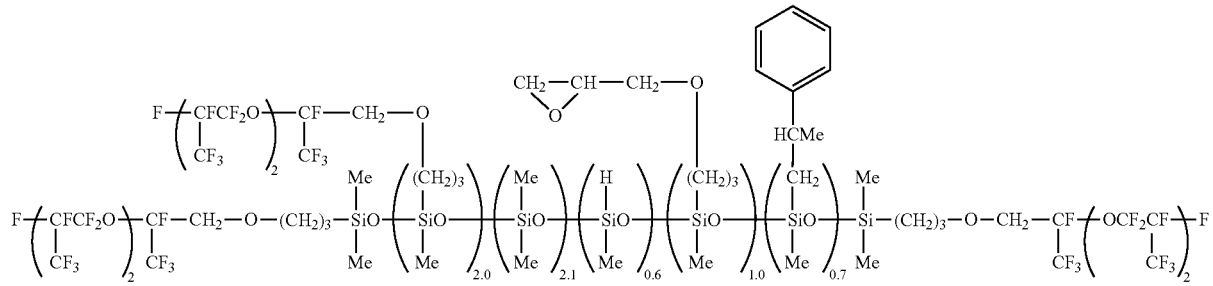

(16)

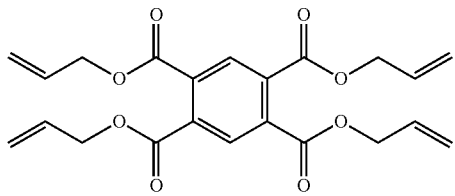

(17)

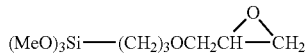

(18)

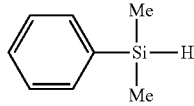

(19)

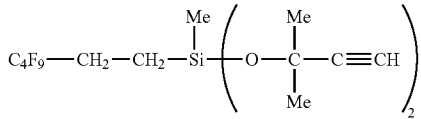

(20)

Next, 2 test panels (100 mm×25 mm) of the substrate of the type shown in Table 1 (aluminum, alumina ceramics, polybuthylene terephthalate (PBT) resin, and polyphenylene sulfide (PPS) resin) were placed one on another with the overlapping width of 10 mm with the intervening layer (thickness, 1 mm) of the composition as described above. The composition was heated at 80° C. for 5 hours to cure the composition and prepare the adhesion test piece. Next, this test piece was evaluated by a tensile shear adhesion test (tensile speed, 50 mm/min) to measure adhesion strength (shear adhesion strength) and percentage of cohesive failure. The results are shown in Table 1.

The thus prepared adhesion test piece was also left at 150° C. for 1,000 hours and evaluated by a tensile shear adhesion test (tensile speed, 50 mm/min) to measure the adhesion strength (shear adhesion strength) and the percentage of cohesive failure. The results are also shown in Table 5.

Example 2

The procedure of Example 1 was repeated except that the fluorine-containing organohydrogenpolysiloxane represented by the average compositional formula (16) was replaced with 9.0 parts of the fluorine-containing organohydrogenpolysiloxane represented by the following average compositional formula (21), and the adhesion test piece was prepared by using the thus prepared composition. The procedure of Example 1 was also repeated to evaluate the adhesion strength (shear adhesion strength) and the percentage of cohesive failure. The results are shown Table 1. The adhesion strength (shear adhesion strength) and the percentage of cohesive failure after leaving the test piece at 150° C. for 1,000 hours were also evaluated. The results are shown Table 5.

(21)

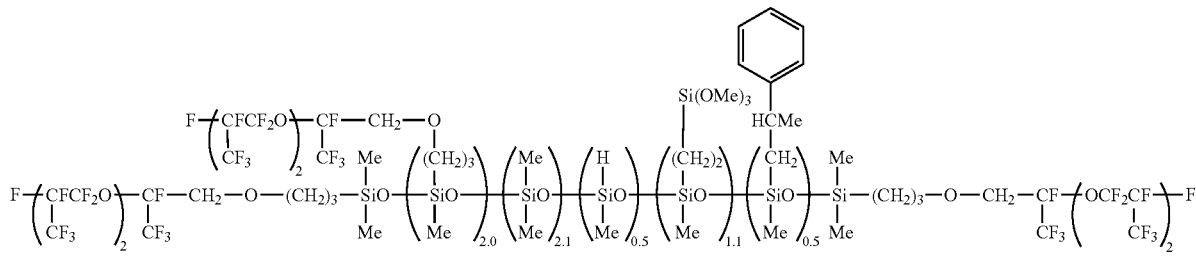

Example 3

The procedure of Example 1 was repeated except that 5.0 parts of the fluorine-containing organohydrogenpolysiloxane represented by the following average compositional formula (21) was additionally used, and the adhesion test piece was prepared by using the thus prepared composition. The procedure of Example 1 was also repeated to evaluate the adhesion strength (shear adhesion strength) and the percentage of cohesive failure. The results are shown Table 1. The adhesion strength (shear adhesion strength) and the percentage of cohesive failure after leaving the test piece at 150° C. for 1,000 hours were also evaluated. The results are shown Table 5.

Example 4

The procedure of Example 1 was repeated except that the organosilicon compound represented by the formula (19) was replaced with 0.20 part of the organosilicon compound represented by the formula (22), and the adhesion test piece was prepared by using the thus prepared composition. The procedure of Example 1 was also repeated to evaluate the adhesion strength (shear adhesion strength) and the percentage of cohesive failure. The results are shown Table 2. The adhesion strength (shear adhesion strength) and the percentage of cohesive failure after leaving the test piece at 150° C. for 1,000 hours were also evaluated. The results are shown Table 6.

(22)

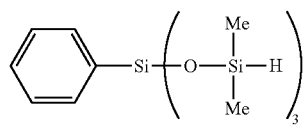

Example 5

The procedure of Example 2 was repeated except that the organosilicon compound represented by the formula (19) was replaced with 0.20 part of the organosilicon compound represented by the formula (22), and the adhesion test piece was prepared by using the thus prepared composition. The procedure of Example 1 was also repeated to evaluate the adhesion strength (shear adhesion strength) and the percentage of cohesive failure. The results are shown Table 2. The adhesion strength (shear adhesion strength) and the percentage of cohesive failure after leaving the test piece at 150° C. for 1,000 hours were also evaluated. The results are shown Table 6.

Example 6

The procedure of Example 3 was repeated except that the organosilicon compound represented by the formula (19) was replaced with 0.20 part of the organosilicon compound represented by the formula (22), and the adhesion test piece was prepared by using the thus prepared composition. The procedure of Example 1 was also repeated to evaluate the adhesion strength (shear adhesion strength) and the percentage of cohesive failure. The results are shown Table 2. The adhesion strength (shear adhesion strength) and the percentage of cohesive failure after leaving the test piece at 150° C. for 1,000 hours were also evaluated. The results are shown Table 6.

Example 7

The procedure of Example 1 was repeated except that the organosilicon compound represented by the formula (19) was replaced with 0.20 part of the organosilicon compound represented by the following formula (23), and the adhesion test piece was prepared by using the thus prepared composition. The procedure of Example 1 was also repeated to evaluate the adhesion strength (shear adhesion strength) and the percentage of cohesive failure. The results are shown Table 3. The adhesion strength (shear adhesion strength) and the percentage of cohesive failure after leaving the test piece at 150° C. for 1,000 hours were also evaluated. The results are shown Table 7.

(23)

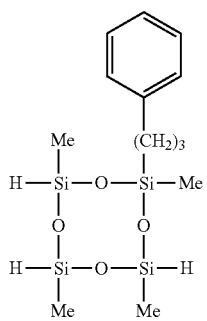

Example 8

The procedure of Example 2 was repeated except that the organosilicon compound represented by the formula (19) was replaced with 0.20 part of the organosilicon compound represented by the formula (23), and the adhesion test piece was prepared by using the thus prepared composition. The procedure of Example 1 was also repeated to evaluate the adhesion strength (shear adhesion strength) and the percentage of cohesive failure. The results are shown Table 3. The adhesion strength (shear adhesion strength) and the percentage of cohesive failure after leaving the test piece at 150° C. for 1,000 hours were also evaluated. The results are shown Table 7.

Example 9

The procedure of Example 3 was repeated except that the organosilicon compound represented by the formula (19) was replaced with 0.20 part of the organosilicon compound represented by the formula (23), and the adhesion test piece was prepared by using the thus prepared composition. The procedure of Example 1 was also repeated to evaluate the adhesion strength (shear adhesion strength) and the percentage of cohesive failure. The results are shown Table 3. The adhesion strength (shear adhesion strength) and the percentage of cohesive failure after leaving the test piece at 150° C. for 1,000 hours were also evaluated. The results are shown Table 7.

Comparative Example 1

The procedure of Example 1 was repeated except that the organosilicon compound represented by the formula (19) was not used, and the adhesion test piece was prepared by using the thus prepared composition. The procedure of Example 1 was also repeated to evaluate the adhesion strength (shear adhesion strength) and the percentage of cohesive failure. The results are shown Table 4. The adhesion strength (shear adhesion strength) and the percentage of cohesive failure after leaving the test piece at 150° C. for 1,000 hours were also evaluated. The results are shown Table 8.

Comparative Example 2

The procedure of Example 2 was repeated except that the organosilicon compound represented by the formula (19) was not used, and the adhesion test piece was prepared by using the thus prepared composition. The procedure of Example 1 was also repeated to evaluate the adhesion strength (shear adhesion strength) and the percentage of cohesive failure. The results are shown Table 4. The adhesion strength (shear adhesion strength) and the percentage of cohesive failure after leaving the test piece at 150° C. for 1,000 hours were also evaluated. The results are shown Table 8.

Comparative Example 3

The procedure of Example 2 was repeated except that the organosilicon compound represented by the formula (19) was not used, and the adhesion test piece was prepared by using the thus prepared composition. The procedure of Example 1 was also repeated to evaluate the adhesion strength (shear adhesion strength) and the percentage of cohesive failure. The results are shown Table 4. The adhesion strength (shear adhesion strength) and the percentage of cohesive failure after leaving the test piece at 150° C. for 1,000 hours were also evaluated. The results are shown Table 8.

TABLE 1

| | Shear adhesion (MPa) | | |
|---|---|---|---|
| Substrate | Example 1 | Example 2 | Example 3 |
| Aluminum | 0.8 | 0.8 | 0.8 |
| | (100) | (100) | (100) |
| Aluminum ceramics | 0.8 | 0.8 | 0.8 |
| | (100) | (100) | (100) |
| PBT | 0.7 | 0.7 | 0.8 |
| | (100) | (100) | (100) |
| PPS | 0.7 | 0.7 | 0.8 |
| | (100) | (100) | (100) |

Percentage of cohesive failure (area percentage) is shown in the bracket under the shear adhesion.

TABLE 2

| | Shear adhesion (MPa) | | |
|---|---|---|---|
| Substrate | Example 4 | Example 5 | Example 6 |
| Aluminum | 0.9 | 0.8 | 0.9 |
| | (100) | (100) | (100) |
| Aluminum ceramics | 0.9 | 0.8 | 0.9 |
| | (100) | (100) | (100) |
| PBT | 0.8 | 0.8 | 0.8 |
| | (100) | (100) | (100) |
| PPS | 0.8 | 0.7 | 0.8 |
| | (100) | (100) | (100) |

Percentage of cohesive failure (area percentage) is shown in the bracket under the shear adhesion.

TABLE 3

| | Shear adhesion (MPa) | | |
|---|---|---|---|
| Substrate | Example 7 | Example 8 | Example 9 |
| Aluminum | 0.7 | 0.7 | 0.7 |
| | (100) | (90) | (100) |
| Aluminum ceramics | 0.7 | 0.7 | 0.7 |
| | (100) | (100) | (100) |
| PBT | 0.7 | 0.7 | 0.6 |
| | (100) | (100) | (100) |
| PPS | 0.7 | 0.6 | 0.6 |
| | (100) | (90) | (100) |

Percentage of cohesive failure (area percentage) is shown in the bracket under the shear adhesion.

TABLE 4

| | Shear adhesion (MPa) | | |
|---|---|---|---|
| Substrate | Comparative Example 1 | Comparative Example 2 | Comparative Example 3 |
| Aluminum | 1.0 | 0.7 | 0.8 |
| | (100) | (90) | (100) |
| Aluminum ceramics | 0.8 | 0.9 | 0.8 |
| | (100) | (100) | (100) |
| PBT | 0.7 | 0.8 | 0.6 |
| | (100) | (100) | (100) |
| PPS | 0.8 | 0.7 | 0.6 |
| | (100) | (90) | (100) |

Percentage of cohesive failure (area percentage) is shown in the bracket under the shear adhesion.

TABLE 5

| | Shear adhesion (MPa) | | |
|---|---|---|---|
| Substrate | Example 1 | Example 2 | Example 3 |
| Aluminum | 0.8 (90) | 0.7 (90) | 0.8 (100) |
| Aluminum ceramics | 0.8 (100) | 0.8 (100) | 0.9 (100) |
| PBT | 0.8 (100) | 0.7 (100) | 0.8 (100) |
| PPS | 0.7 (100) | 0.6 (90) | 0.8 (100) |

Percentage of cohesive failure (area percentage) is shown in the bracket under the shear adhesion.

TABLE 6

| | Shear adhesion (MPa) | | |
|---|---|---|---|
| Substrate | Example 4 | Example 5 | Example 6 |
| Aluminum | 0.8 (100) | 0.7 (90) | 0.9 (100) |
| Aluminum ceramics | 0.9 (100) | 0.8 (100) | 0.9 (100) |
| PBT | 0.8 (100) | 0.7 (100) | 0.8 (100) |
| PPS | 0.8 (100) | 0.7 (90) | 0.8 (100) |

Percentage of cohesive failure (area percentage) is shown in the bracket under the shear adhesion.

TABLE 7

| | Shear adhesion (MPa) | | |
|---|---|---|---|
| Substrate | Example 7 | Example 8 | Example 9 |
| Aluminum | 0.7 (100) | 0.7 (90) | 0.7 (100) |
| Aluminum ceramics | 0.7 (100) | 0.8 (100) | 0.7 (100) |
| PBT | 0.7 (100) | 0.7 (100) | 0.6 (100) |
| PPS | 0.7 (100) | 0.6 (90) | 0.6 (100) |

Percentage of cohesive failure (area percentage) is shown in the bracket under the shear adhesion.

TABLE 8

| | Shear adhesion (MPa) | | |
|---|---|---|---|
| Substrate | Comparative Example 1 | Comparative Example 2 | Comparative Example 3 |
| Aluminum | 0.3 (10) | 0.2 (0) | 0.4 (10) |
| Aluminum ceramics | 0.5 (50) | 0.3 (30) | 0.5 (50) |
| PBT | 0.5 (70) | 0.5 (70) | 0.4 (70) |
| PPS | 0.4 (30) | 0.3 (20) | 0.3 (30) |

Percentage of cohesive failure (area percentage) is shown in the bracket under the shear adhesion.

Japanese Patent Application No. 2010-254812 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A thermosetting fluoropolyether adhesive composition comprising
   (A) 100 parts by weight of a straight chain polyfluoro compound represented by the following general formula (1):

$$CH_2=CH-(X)_a-Rf^1-(X')_a-CH=CH_2 \quad (1)$$

wherein X is $-CH_2-$, $-CH_2O-$, $-CH_2OCH_2-$, or $-Y-NR^1-CO-$ (wherein Y is $-CH_2-$ or an o-, m-, or p-dimethylsilylphenylene group represented by the structural formula (2):

$R^1$ is hydrogen atom or a substituted or unsubstituted monovalent hydrocarbon group), X' is $-CH_2-$, $-OCH_2-$, $-CH_2OCH_2-$, or $-CO-NR^1-Y'-$ (wherein Y' is $-CH_2-$ or an o-, m-, or p-dimethylsilylphenylene group represented by the following structural formula (3):

and
$R^1$ is as defined above), a is independently 0 or 1, $Rf^1$ is a divalent perfluoropolyether group represented by the following general formula (4):

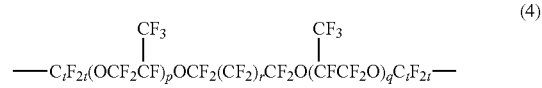

wherein p and q are independently an integer of 1 to 150, and sum of p and q on average is 2 to 300, and r is an integer of 0 to 6, and t is 2 or 3), or the following general formula or (5):

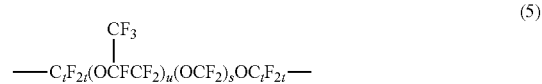

wherein u is an integer of 1 to 300, s is an integer of 1 to 80, and t is as defined above);
   (B) a fluorine-containing organohydrogenpolysiloxane containing at least two hydrogen atoms directly bonded to the silicon atom (SiH group) per molecule, and having no other functional group in the molecule, at an amount such that the SiH group is 0.5 to 3.0 mole per mole of the alkenyl group in the component (A);

(C) a platinum group metal catalyst at an amount such that the platinum group metal atom is 0.1 to 500 ppm by weight of the component (A);

(D) 0.1 to 20 parts by weight of a fluorine-containing organohydrogenpolysiloxane containing a fluorine-containing organic group, hydrogen atom directly bonded to the silicon atom (SiH group), epoxy group and/or tri(organoxy)silyl group bonded to the silicon atom via carbon atom or carbon and oxygen atoms, and an aryl group bonded to the silicon atom via the carbon atom in one molecule;

(E) 0.01 to 5 parts by weight of an organic compound represented by the following general formula (6):

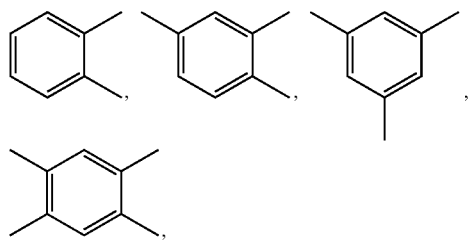

(6)

wherein A is a divalent to tetravalent group selected from —CH=CH—, —CH$_2$CH$_2$—, and

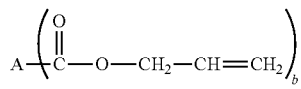

and b is valence of the group A, and (F) 0.01 to 5 parts by weight of an organosilicon compound having at least one epoxy group and at least one organoxy group directly bonded to the silicon atom in one molecule, and not containing hydrogen atom bonded to the silicon atom (SiH group) in the molecule, and (G) 0.01 to 10 parts by weight of an organosilicon compound having at least one hydrogen atom bonded to the silicon atom (SiH group) and at least one aryl group directly bonded to the silicon atom or bonded to the silicon atom via carbon atom or carbon and oxygen atoms in one molecule, and not containing epoxy group or a tri(organoxy)silyl group bonded to the silicon atom via carbon atom or carbon and oxygen atoms, or a fluorine-containing organic group.

2. A thermosetting fluoropolyether adhesive composition according to claim 1 wherein content of the alkenyl group in the straight chain polyfluoro compound of component (A) is 0.002 to 0.3 mol/100 g.

3. A thermosetting fluoropolyether adhesive composition according to claim 1 wherein the fluorine-containing organohydrogenpolysiloxane of component (B) has at least one monovalent perfluoroalkyl group, monovalent perfluoroxyalkyl group, divalent perfluoroalkylene group, or divalent perfluorooxyalkylene group per molecule.

4. A thermosetting fluoropolyether adhesive composition according to claim 1 wherein the fluorine-containing organic group in the component (D) is a monovalent fluorine-containing organic group at both ends and side chain of the molecular chain.

5. A thermosetting fluoropolyether adhesive composition according to claim 1 wherein the fluorine-containing organohydrogenpolysiloxane in the component (D) is the one having a monovalent perfluoroalkyl group bonded to the silicon atom via carbon atom or a monovalent perfluoroxyalkyl group bonded to the silicon atom via carbon and oxygen atoms.

6. A thermosetting fluoropolyether adhesive composition according to claim 1 wherein the component (D) is a fluorine-containing organohydrogenpolysiloxane represented by the following average compositional formula (7):

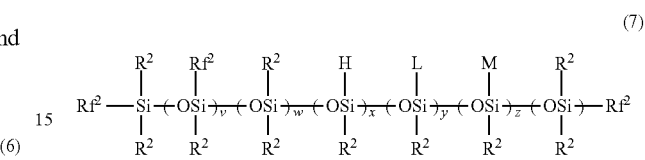

(7)

wherein $R^2$ is independently a substituted or unsubstituted monovalent hydrocarbon group, L is independently epoxy group and/or a tri(organoxy)silyl group bonded to the silicon atom via carbon atom or carbon and oxygen atoms, M is independently an aryl group bonded to the silicon atom via carbon atom, $Rf^2$ is independently a monovalent perfluoroalkyl group bonded to the silicon atom via carbon atom or a monovalent perfluoroxyalkyl group bonded to the silicon atom via carbon and oxygen atoms, v is a real number of $0<v\leq10.0$, w is a real number of $0<w\leq10.0$, x is a real number of $0<x\leq10.0$, y is a real number of $0<y\leq10.0$, and z is a real number of $0<z\leq10.0$ with the proviso that $0<v+w+x+y+z\leq30.0$.

7. A thermosetting fluoropolyether adhesive composition according to claim 1 wherein the component (E) is an aromatic polyhydric allyl ester compound selected from those represented by the following structural formulae:

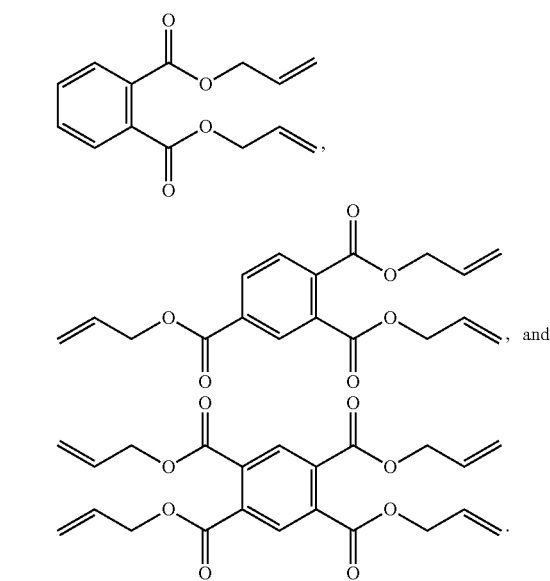

8. A method for adhering the thermosetting fluoropolyether adhesive composition of claim 1 to a metal, inorganic, or plastic substrate, comprising the step of heating and curing the composition on the metal, inorganic, or plastic substrate at a temperature lower than 100° C.

* * * * *